Figure 1:
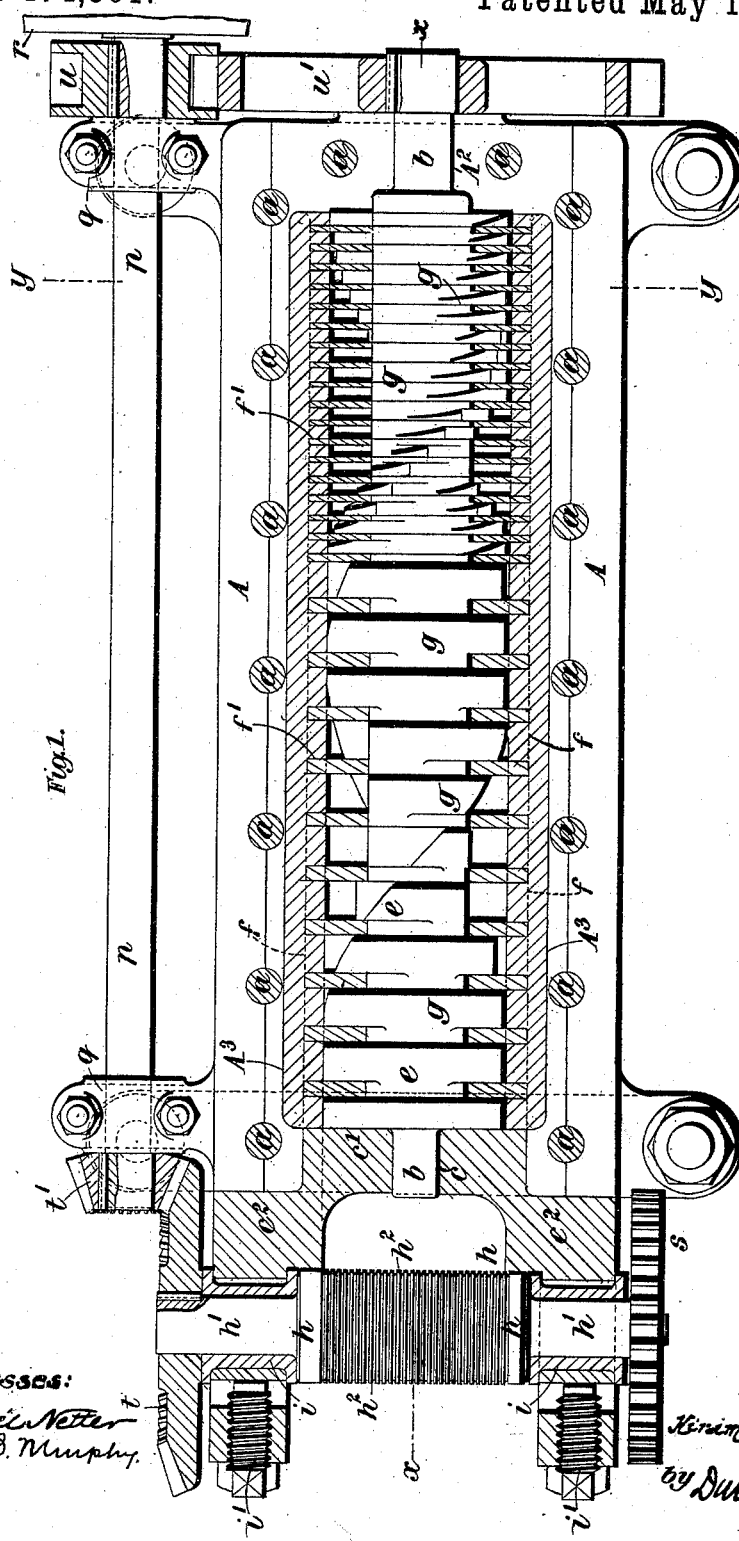

(No Model.) 7 Sheets—Sheet 1.
H. S. MAXIM.
APPARATUS FOR THE MANUFACTURE OF EXPLOSIVES.
No. 474,561. Patented May 10, 1892.

Witnesses:
Raphael Netter
Frank B. Murphy

Inventor
Hiram S. Maxim
by Duncan & Page
Attorneys (No Model.) 7 Sheets—Sheet 3.

H. S. MAXIM.
APPARATUS FOR THE MANUFACTURE OF EXPLOSIVES.

No. 474,561. Patented May 10, 1892.

Witnesses:
Raphaël Netter
Frank B. Murphy

Inventor
Hiram S. Maxim
by Duncan & Page.
Attorneys (No Model.) 7 Sheets—Sheet 5.
H. S. MAXIM.
APPARATUS FOR THE MANUFACTURE OF EXPLOSIVES.
No. 474,561. Patented May 10, 1892.

Witnesses:
Raphael Netter
Frank B. Murphy

Inventor
Hiram S. Maxim.
by Duncan & Page
Attorneys.

(No Model.) 7 Sheets—Sheet 6.

H. S. MAXIM.
APPARATUS FOR THE MANUFACTURE OF EXPLOSIVES.

No. 474,561. Patented May 10, 1892.

Witnesses:
Raphael Netter
Frank D. Murphy

Inventor
Hiram S. Maxim
by Duncan & Page
Attorneys.

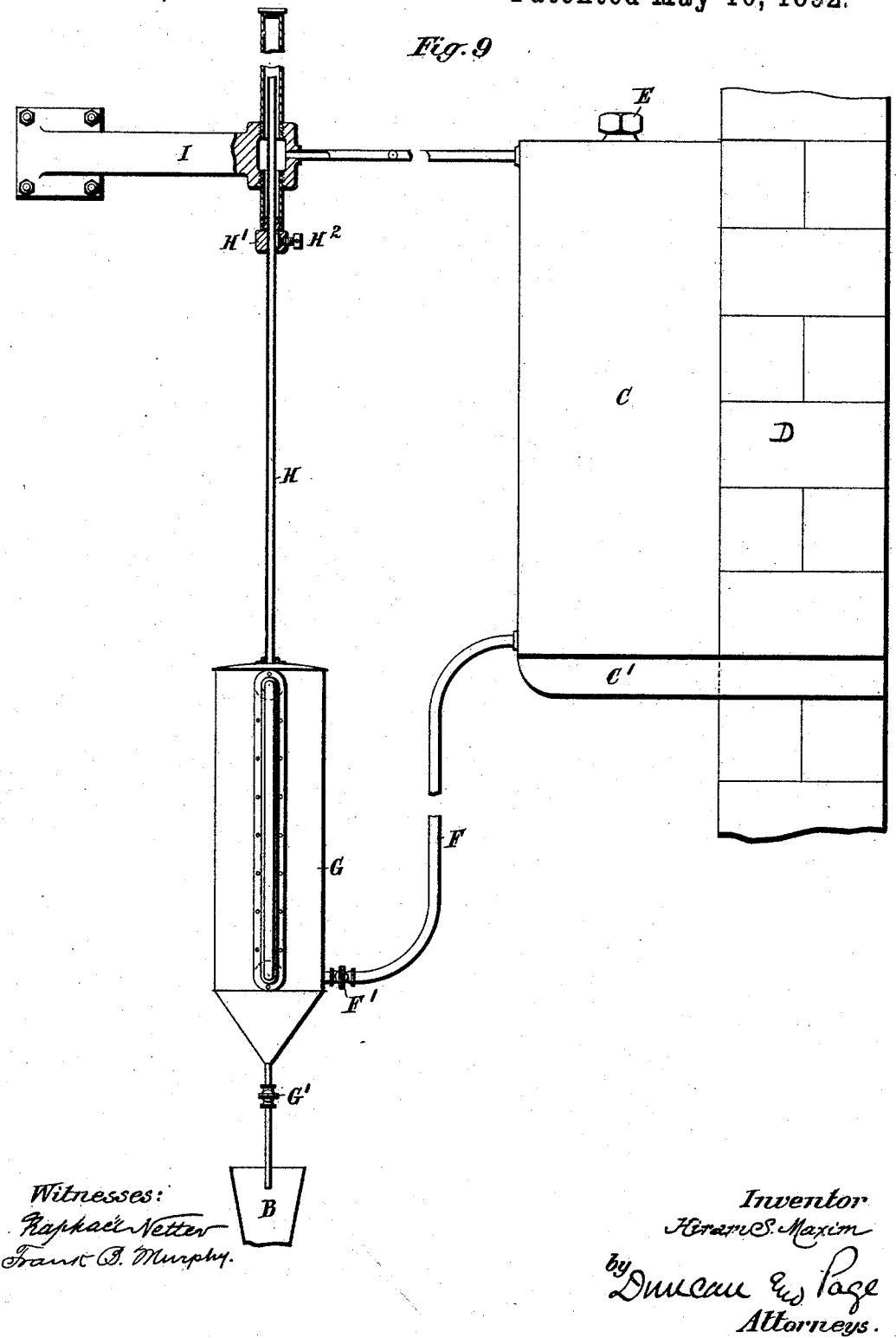

UNITED STATES PATENT OFFICE.

HIRAM STEVENS MAXIM, OF LONDON, ENGLAND.

APPARATUS FOR THE MANUFACTURE OF EXPLOSIVES.

SPECIFICATION forming part of Letters Patent No. 474,561, dated May 10, 1892.

Application filed February 6, 1891. Serial No. 380,449. (No model.) Patented in Spain July 23, 1890, No. 10,851.

*To all whom it may concern:*

Be it known that I, HIRAM STEVENS MAXIM, mechanical engineer, a citizen of the United States, and a resident of London, England, have invented certain new and useful Improvements Relating to Machinery or Apparatus for the Manufacture of Explosives and for Similar Purposes, (for which I have obtained a patent in Spain, dated July 23, 1890, No. 10,851,) of which the following is a specification, reference being had to the accompanying drawings.

My invention relates to the manufacture of explosives and to machinery or apparatus therefor and for similar purposes.

My said invention is chiefly designed to supersede former methods of manufacture in which the several ingredients are mixed by hand or otherwise and then subjected to various operations in separate machines.

According to my present invention I provide for the manufacture of explosive compounds in a continuous manner in a machine or apparatus wherein all of the required operations are effected automatically, the attendant merely having to keep the said machine or apparatus supplied with the necessary ingredients and to collect the grains of the explosive material or "powder" as they fall from the said machine.

In carrying my said invention into practice I proceed as follows, viz: In the manufacture, for example, of an explosive compound from gun-cotton or pyroxyline dissolved by means of acetone or any other suitable solvent, I introduce into the hopper of the machine the gun-cotton and the required quantity of solvent. The gun-cotton and the solvent pass from the said hopper into a cylinder or chamber, in which the ingredients are thoroughly mixed and the mass well kneaded by means of fixed and rotary knives or blades somewhat like those employed in mincing-machines. The rotary knives or blades are arranged in the form of a worm or helix, so that they force the material along the cylinder or chamber away from the hopper and through devices for forming the said material into strips or threads and for cutting the said strips or threads into small pieces or grains.

In the accompanying drawings I have shown how my said invention may be conveniently and advantageously carried into practice.

Figure 2:
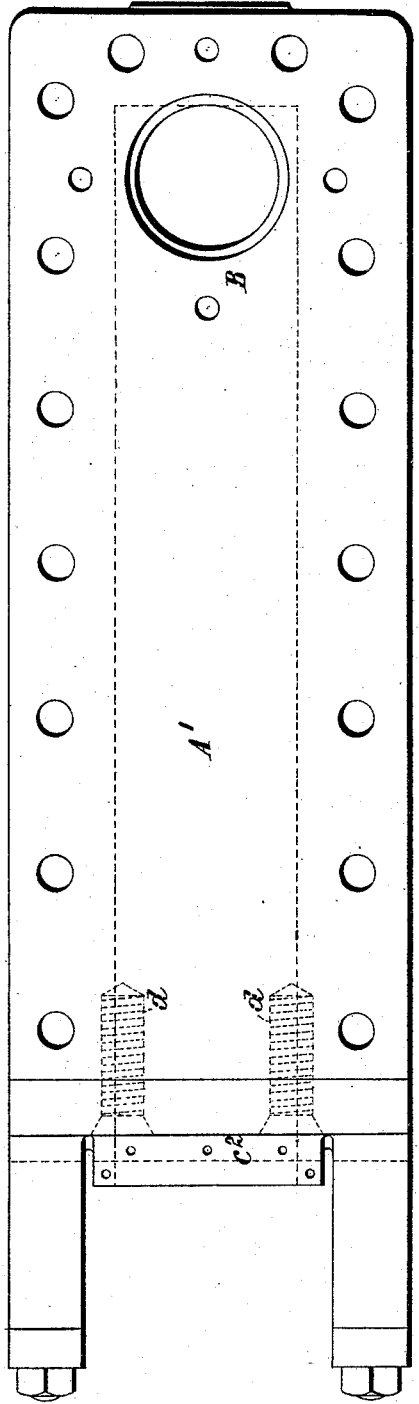
Figure 3:
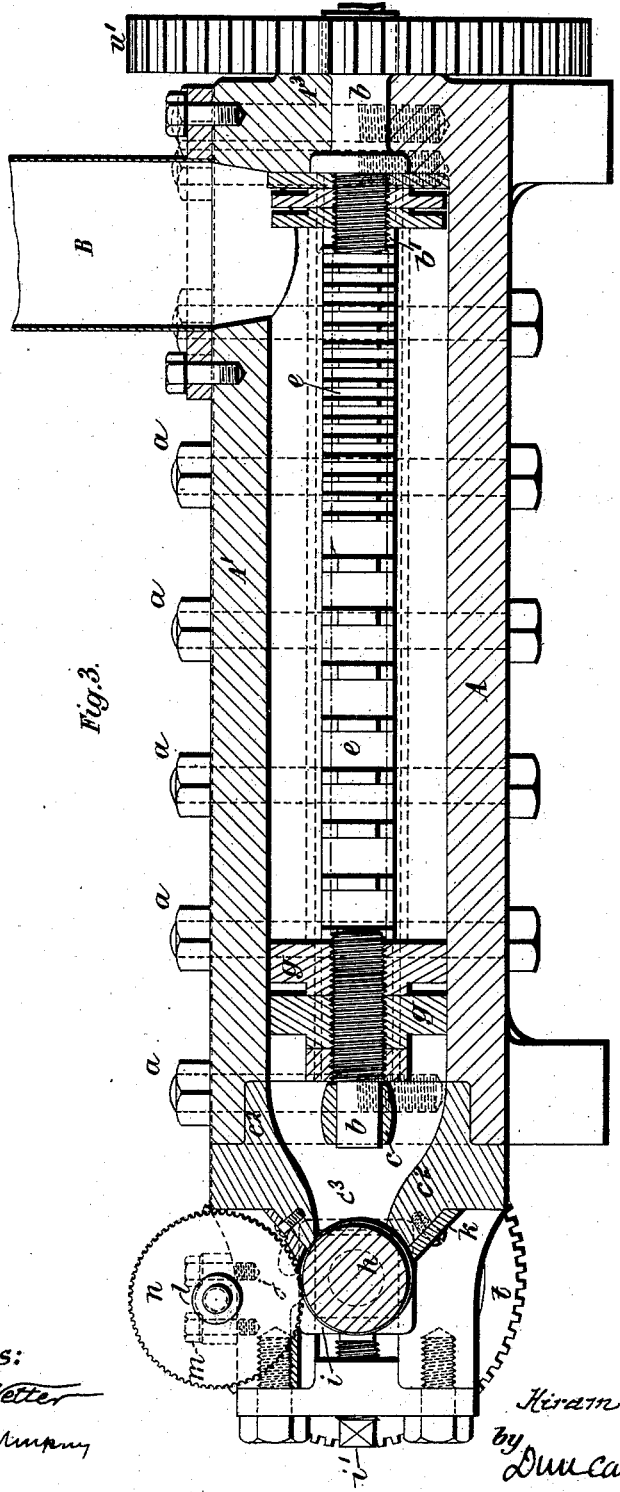
Figure 4:
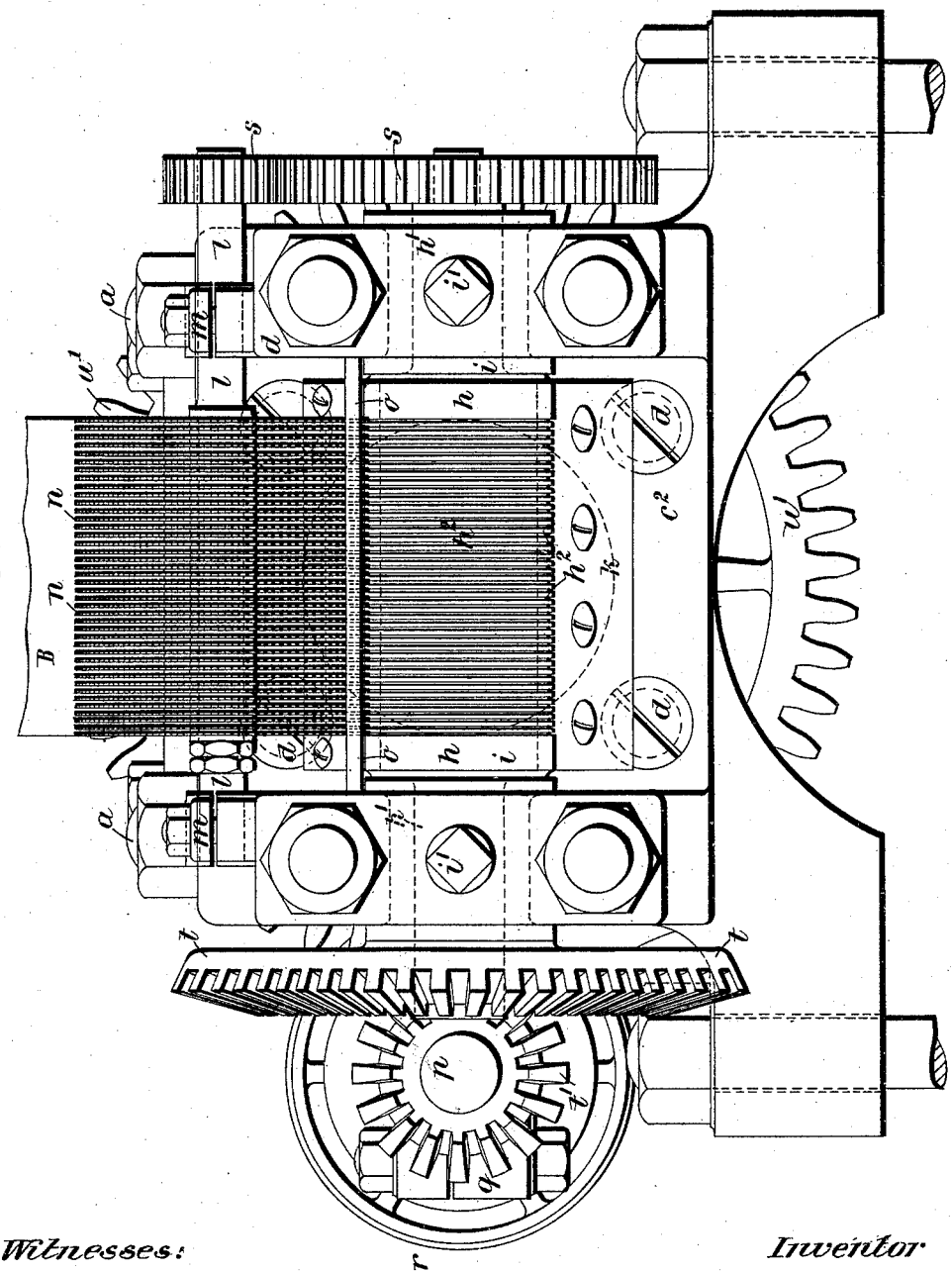
Figure 5:
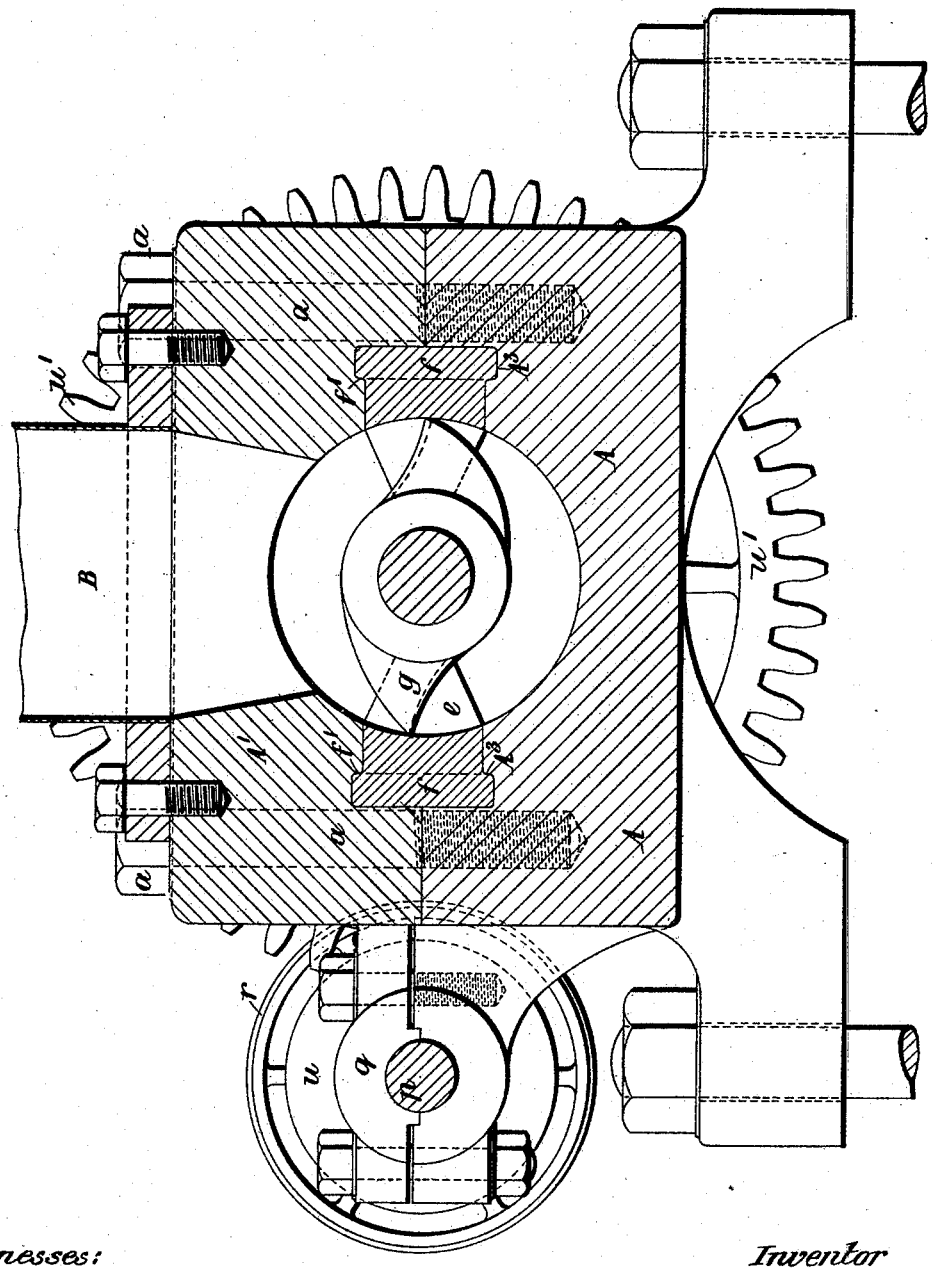
Figure 6:
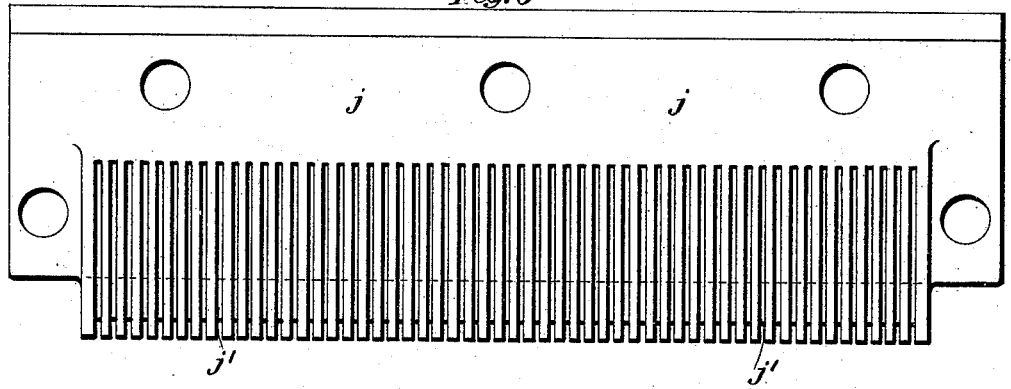
Figure 7:
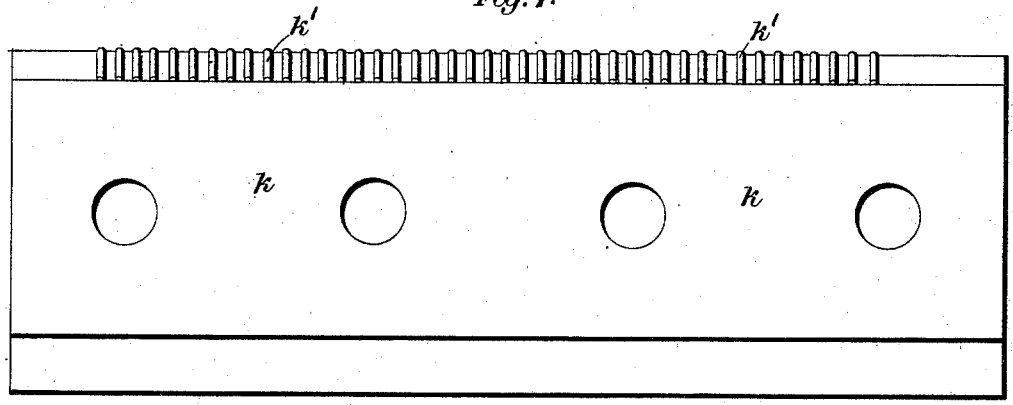
Figure 8:
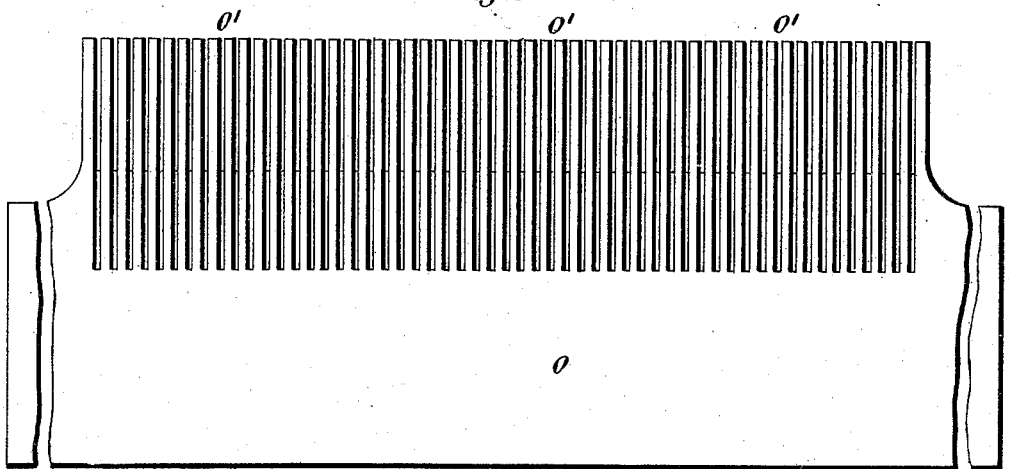

Figure 1 is a sectional plan, partly in horizontal section, the cover or upper part of the casing being removed, illustrating my apparatus for the manufacture of smokeless powder. Fig. 2 is a plan of the said cover or upper part of the casing. Fig. 3 is a vertical longitudinal central section on the line $x\ x$, Fig. 1. Fig. 4 is an end elevation, drawn to an enlarged scale, of the apparatus shown in Fig. 1. Fig. 5 is a transverse section on the line $y\ y$, Fig. 1, drawn to the same scale as Fig. 4. Figs. 6, 7, and 8 are views showing details of construction. Fig. 9 is a front elevation, partly in section, showing an improved tank for supplying the acetone or other solvent.

Like letters of reference indicate corresponding parts throughout the drawings.

A is the lower or main part of the cylinder or chamber of the mixer, and A' is the top, cover, or upper part thereof.

B is the chute, hopper, or feed-aperture.

The lower or main part A is firmly secured to the top, cover, or upper part A' by bolts $a$ or in any other convenient manner. The said lower or main part A and cover or upper part A' of the said cylinder or chamber are each closed at one end, and these ends are bored out to form a bearing $A^2$ to receive one extremity of a shaft $b$, which extends longitudinally through the said cylinder or chamber and is provided with suitable means (hereinafter described, for imparting rotary motion to it. The other end of the said shaft $b$ is supported by a suitable bearing $c$ in a cross bar or piece $c'$, either formed on or firmly attached to a mouthpiece $c^2$, secured by means of screws $d$ to the open extremity of the said cylinder or chamber A. In the said cylinder or chamber are provided at suitable distances apart throughout the length of the cylinder a large number of fixed or stationary knives or blades $e$. The said stationary knives or blades $e$ are arranged to fit into slots $f'$, provided in bars $f$, which, as shown more clearly in Fig. 5, slide into suitable grooves $A^3$, formed partly in the lower portion A and partly in the top or cover A' of the said chamber. The shaft $b$ has also fixed thereon, by means of screw-threads $b'$, Fig. 3, or in any other suitable manner, a large number of knives or blades $g$, so shaped that on being placed in their proper relative positions they form a practically continuous worm or helix around the said shaft. The knives or blades $g$ are arranged at suitable distances apart, or sufficient clearance is provided, so that they will work between the fixed or stationary knives or blades $e$. The mouthpiece $c^2$ is provided with an opening or aperture $c^3$, one end of which corresponds with the dimensions of the said cylinder or chamber and the other or outer end whereof is of reduced dimensions. At the open end of the said cylinder or chamber, and in the reduced part of the aperture $c^3$, is arranged a roll $h$, the gudgeons $h'$ of which are supported in adjustable bearings $i$ on the mouthpiece $c^2$ and are provided with setting-up screws $i'$. The roll $h$ has a number of parallel circumferential grooves or channels $h^2$ and its axis is at right angles to that of the shaft $b$.

$j$ is a metal casting or plate, the edge of which lies parallel to the axis of roll $h$ and which is formed with grooves or channels $j'$, corresponding to those in roll $h$, (more clearly shown in Fig. 6,) and firmly attached to the mouthpiece $c^2$ in the end of the said cylinder or chamber A, so that when the roll $h$ is rotated about its axis the material will be forced out through the aperture of the said mouth part and between the grooves or channels $j'$ in the said piece $j$ and the grooves or channels $h^2$ in the said roll $h$ in the form of strips or threads.

$k$ is another metal casting or plate also attached to the mouthpiece $c^2$ and opposite the aforesaid grooved part $j$ and provided with projections or ribs $k'$, (more clearly shown in Fig. 7,) which fit into the grooves $h^2$ in the roll $h$, so as to form a tight joint and prevent the escape of the material between the said roll and this ribbed part. Above this roll is a shaft or spindle $l$, parallel to the said roll $h$ and supported in suitable bearings $m$ in the said mouthpiece $c^2$.

$n$ $n$ are toothed disks or cutters somewhat resembling circular saws. The toothed disks or cutters $n$ are firmly secured upon the shaft or spindle $l$ in such a manner that the periphery of each of the said toothed disks or cutters when revolving moves in one of the grooves $h^2$ in the roll $h$, so that in the operation of the machine the threads or strips of material passing along the said grooves will be cut by the said teeth into small pieces or grains.

$o$ is a plate having teeth or projections $o'$ (more clearly shown in Fig. 8) and somewhat resembling a comb. The said teeth $o'$ are arranged between the toothed disks or cutters $n$ and form scrapers to clean the sides thereof and remove any of the material that might adhere thereto.

$p$ is a main or driving shaft supported in suitable bearings $q$ on the lower part A of the cylinder or chamber and having at one extremity a pulley $r$ for receiving power by means of belt-gearing from any suitable source.

The shaft or spindle $l$ is geared to one of the gudgeons $h'$ of the roll $h$ by means of toothed wheels $s$, and the other gudgeon $h'$ has fixed thereon a miter or bevel wheel $t$, gearing with another miter or bevel wheel $t'$, secured upon the main shaft $p$ of the machine. The said main shaft, moreover, is geared to the shaft or spindle $b$ by means of a pinion $u$ and a toothed wheel $u'$. In some instances suitable provision is made for varying the relative speed of the roll $h$ and toothed disks or cutters $n$, so that the machine may be adapted to cut grains of any desired size.

In the manufacture, for example, of an explosive compound from gun-cotton or pyroxyline by dissolving it by means of acetone or any other suitable solvent, I introduce into the hopper or chute B of the machine the gun-cotton and the required quantity of solvent. The gun-cotton and the solvent pass from the said hopper into the above-described cylinder or chamber, in which the ingredients are thoroughly mixed and the mass well kneaded by means of the fixed or stationary knives or blades $e$ and the rotary knives or blades $g$, which are somewhat like those employed in mincing-machines. The said rotary knives or blades being arranged, as hereinbefore mentined, in the form of a worm or helix, they force the material along the cylinder or chamber away from the hopper or chute B. When the ingredients (which by this time, owing to the action of the liquid and to the pressure derived from the screw or worm, have assumed a thick pasty form) have been forced to the end of the machine, there being no outlet, except through the grooves or channels $h^2$ in the roll $h$ and the grooves $j'$ in the metal part $j$, attached to the mouthpiece $c^2$, the material is forced through these grooves in the form of threads or strips and carried around by the roll till the teeth of the disks or cutters $n$, falling into the grooves or channels $h^2$, divide the said threads or strips into small pieces or grains, the size of which can be regulated by varying the relative speeds of the said grooved roll $h$ and the toothed disks or cutters $n$, as above specified. Any of the said small pieces or grains which may adhere to the roll $h$ will be removed by the plate $k$.

I sometimes combine with the apparatus above described a tank or vessel C—such as shown in Fig. 9—for containing acetone or other solvent and means for supplying the said solvent in regulated or predetermined quantities into the said hopper B. The tank or vessel C is supported upon a bracket C', secured to a wall or other surface D or in any other convenient manner, and is provided at its upper extremity with a suitable aperture (for convenience of charging the same) closed by means of a screw-plug E. The said tank C is connected by a flexible pipe F with a smaller tank G, so that the small tank may be filled with a suitable measure or quantity of the solvent, according to the charge of gun-cotton placed in the aforesaid hopper. The said tanks are also connected with a pipe H for admitting air as the liquid runs out of the smaller tank. A cock or valve F' is provided for shutting off communication with the large tank C when the small tank G is charged with the required measure of the solvent. Another small cock or valve G' is also provided for opening and closing the communication with the hopper B of the mixer or powder-mill. H' is a sliding joint provided to allow the small tank to be raised clear of the said mixer or powder-mill when necessary, and H² is a set-screw for securing the said tank either when in operation or when lifted clear of the hopper. The outer tube of the sliding joint is supported by a suitable bracket I or in any other convenient manner.

This apparatus is also applicable to the manufacture of other substances which require to be worked in a semi-fluid or plastic state and formed into strips or threads or into small pieces or grains.

What I claim is—

1. In an apparatus for manufacturing explosives, the combination, with a chamber provided with a hopper for the introduction of the ingredients, helical mixing blades or knives working in the same, and a grooved roller at the outlet of the chamber and closing the same, except through said grooves, whereby the mixture will be forced out in threads or strings through the grooves, as set forth.

2. In an apparatus for manufacturing explosives, the combination, with a chamber provided with a hopper for the introduction of the ingredients, helical mixing blades or knives working in the same, a grooved roller placed at the outlet of said chamber and closing the same, except through the grooves, and a fixed plate or piece with serrations or teeth fitting into the grooves on one side of the roller and closing them against the passage of the material from the chamber, as set forth.

3. The combination, in a machine for manufacturing explosives, with the mixing-chamber having a feed-hopper at one end, of blades or knives working therein and adapted to mix the ingredients and force them through said chamber, of a grooved cylinder closing the outlet to the chamber, except through the grooves, whereby the mixture will issue from the chamber in threads or strings, and a rotating cutter acting on the threads or strings as they are formed and adapted to subdivide the same into grains, as set forth.

4. The combination, with a mixing or kneading apparatus having fixed knives or blades and rotary helical knives or blades, of a cylinder or roll having circumferential grooves and arranged at the discharge end of the said apparatus, a stationary grooved piece between which and the said cylinder the material will be forced in the form of strips or threads, and toothed disks or cutters for further dividing the strips into small pieces or grains, for the purpose above specified.

In testimony whereof I have hereunto signed my name in the presence of two subscribing witnesses.

HIRAM STEVENS MAXIM.

Witnesses:
DAVID YOUNG,
CHAS. B. BURDON.